(12) United States Patent
Loud, III

(10) Patent No.: US 8,651,018 B1
(45) Date of Patent: Feb. 18, 2014

(54) COMBINATION FOOD SMOKER AND GRILL SYSTEM

(76) Inventor: Charlie Loud, III, San Antonio, TX (US)

( * ) Notice: Subject to any disclaimer, the term of this patent is extended or adjusted under 35 U.S.C. 154(b) by 18 days.

(21) Appl. No.: 13/475,987

(22) Filed: May 20, 2012

(51) Int. Cl.
*A47J 37/07* (2006.01)

(52) U.S. Cl.
USPC .............. 99/482; 126/25 R; 126/9 R; 99/467; 99/473; 99/481

(58) Field of Classification Search
USPC ........... 99/467, 473, 481, 482, 340, 343, 448, 99/416, 417, 446, 352
See application file for complete search history.

(56) References Cited

U.S. PATENT DOCUMENTS

| | | | | |
|---|---|---|---|---|
| 2,906,191 A * | 9/1959 | Lee, Sr | ........................ | 99/342 |
| 3,286,620 A * | 11/1966 | Brown | ........................ | 99/446 |
| 3,299,800 A * | 1/1967 | Angelo | ........................ | 99/417 |
| 3,333,526 A * | 8/1967 | Kirkpatrick | ........................ | 99/347 |
| 3,561,348 A * | 2/1971 | Weir, Sr. | ........................ | 99/357 |
| 3,593,647 A * | 7/1971 | Copeland, Jr. | ........................ | 99/339 |
| 3,712,819 A * | 1/1973 | Zeman | ........................ | 99/400 |
| 3,765,397 A * | 10/1973 | Henderson | ........................ | 126/25 R |
| 3,776,127 A * | 12/1973 | Muse | ........................ | 99/482 |
| 4,020,322 A * | 4/1977 | Muse | ........................ | 219/392 |
| 4,094,295 A * | 6/1978 | Boswell et al. | ........................ | 126/25 R |
| 4,300,444 A * | 11/1981 | Muse | ........................ | 99/448 |
| 4,495,860 A * | 1/1985 | Hitch et al. | ........................ | 99/340 |
| 4,498,452 A * | 2/1985 | Schlosser et al. | ........................ | 126/9 R |
| 4,512,249 A * | 4/1985 | Mentzel | ........................ | 99/352 |
| 4,554,864 A * | 11/1985 | Smith et al. | ........................ | 99/340 |
| 4,576,140 A * | 3/1986 | Schlosser | ........................ | 126/25 R |
| 4,587,947 A * | 5/1986 | Tomita | ........................ | 126/25 R |
| 4,909,235 A * | 3/1990 | Boetcker | ........................ | 126/9 R |
| 4,924,071 A * | 5/1990 | Jacobs | ........................ | 219/400 |
| 4,962,696 A * | 10/1990 | Gillis | ........................ | 99/340 |
| 4,962,697 A * | 10/1990 | Farrar | ........................ | 99/340 |
| 4,979,436 A * | 12/1990 | McGowan | ........................ | 99/340 |
| 5,163,359 A * | 11/1992 | McLane, Sr. | ........................ | 99/447 |
| 5,176,124 A * | 1/1993 | Wrasse | ........................ | 126/25 R |
| 5,191,831 A * | 3/1993 | Walden | ........................ | 99/446 |
| 5,218,950 A * | 6/1993 | Hait | ........................ | 126/9 R |
| 5,320,028 A * | 6/1994 | Grunberg | ........................ | 99/340 |
| 5,425,352 A * | 6/1995 | Gillam et al. | ........................ | 126/25 R |
| 5,467,692 A * | 11/1995 | Perez, III | ........................ | 99/340 |
| 5,473,979 A * | 12/1995 | Ruben | ........................ | 99/446 |
| 5,718,165 A * | 2/1998 | Winstead | ........................ | 99/400 |
| 5,865,099 A * | 2/1999 | Waugh | ........................ | 99/340 |
| 5,891,498 A * | 4/1999 | Boehler | ........................ | 426/314 |
| 6,213,006 B1 * | 4/2001 | Reardon et al. | ........................ | 99/446 |
| 6,598,598 B1 * | 7/2003 | Bratsikas | ........................ | 126/25 R |
| 6,962,106 B2 * | 11/2005 | Viraldo | ........................ | 99/339 |
| 7,900,624 B2 * | 3/2011 | DeMars et al. | ........................ | 126/25 R |
| 8,166,870 B2 * | 5/2012 | Badin | ........................ | 99/357 |

(Continued)

*Primary Examiner* — Henry Yuen
*Assistant Examiner* — Jimmy Chou

(57) ABSTRACT

A combination food smoker and grill system that is an effective ellipsoid shaped food smoker designed to prevent direct contact of the meat to be grilled with an open flame thereby preventing the creation of carcinogenic, carbonized meat. More specifically, the combination food smoker and grill system is a pedestal smoker and grill assembly having an upper portion grill chamber with a hinged dome cover having at least one lift handle, an adjustable heat discharge vent, a lower portion grill chamber with a first comestible grill-screen, a second comestible grill-screen, a plurality of first comestible grill-screen supports, a plurality of second comestible grill-screen supports, a smoker screen assembly, a heat portal, and a heat column assembly having a base.

18 Claims, 5 Drawing Sheets

(56) References Cited

U.S. PATENT DOCUMENTS

| | | | |
|---|---|---|---|
| 8,464,702 B2 * | 6/2013 | Foster | 126/25 R |
| 2004/0226454 A1 * | 11/2004 | Pirkle et al. | 99/331 |
| 2009/0173238 A1 * | 7/2009 | Martinez et al. | 99/352 |
| 2011/0219958 A1 * | 9/2011 | Noble | 99/473 |

\* cited by examiner

COMBINATION FOOD SMOKER AND GRILL SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of food preparation and more specifically relates to a combination food smoker and griller.

2. Description of the Related Art

Since the early history of most civilizations and cultures, open fire and fire oven cooking of meats has been practiced as a matter of necessity. Curing and dehydration of meats using constant low heat and salts has also been used since ancient times and is still in use today. Another common method of meat cooking and/or meat preservation is smoking. Meat smoking infuses the meat with the smell of the burning wood and when coupled with the flavors of the cooking meat juices, it creates an irresistible flavor for most people.

Since the time that foods were commonly cooked over open fires, many advances in technology have taken place. Utilities including propane and natural gas are now piped underground to nearly every home. Modern appliances have created conveniences and time savings for members of most societies. Fire codes as well as limited time in busy modern cultures have gradually moved most cooking indoors. A favorite pastime after a busy work-week is for a family to move out to the back yard to grill steaks, hotdogs, and hamburgers on the barbecue grill. A barbecue grill is a device for cooking food by applying heat directly from below, usually with an open flame. The heat in barbecue grills is difficult to control, and as such, requires sufficient skill and constant oversight in making perfect steaks or hamburgers.

There are several varieties of such grills, with most falling into one of two categories: gas-fueled and charcoal. There is a great debate over the merits of charcoal vs. gas for use as the cooking method between barbecue grillers, however, nearly all agree that the open flame produces flavor that an oven or frying pan cannot reproduce. Smoked meat is generally more expensive than non-smoked meat when purchasing it at a grocery store. Adding damp wood to burning charcoal seems to give the meat a weak smoke flavor but the meat is not truly smoked, and consumers are reluctant to purchase expensive home smokers for occasional use. Meat that has been completely cooked with smoke is arguably much more flavorful because of the stronger smoke flavor, but also has the added health advantage of not having directly contacted the flame.

Because of the lack of control over the heat in barbecues, carbon is almost always present in grilled meat when grilling in the back yard. Commercial smokers are large and heavy but produce very satisfactory flavor as well as cooked meat that is free from carcinogens. Smaller home-use smokers are still generally too large to be very portable as well as being too small to prevent the flame from directly contacting the meat; an undesirable condition. Small charcoal smokers are not known to produce very good results, mainly because of their close resemblance to the design of ordinary barbecue grills. A solution to these problems is needed.

Various attempts have been made to solve the above-mentioned problems such as those found in U.S. Pat. Nos. 4,495,860; 4,512,249; 5,425,352; 3,776,127; 4,020,322; and 3,333,526. This prior art is representative of food smoker/grillers. None of the above inventions and patents, taken either singly or in combination, is seen to describe the invention as claimed.

Ideally, a combination food smoker and griller should be portable as well as prevent direct flame contact with the food cooked thereon, and yet, would operate reliably and be manufactured at a modest expense. Thus, a need exists for a reliable combination food smoker and grill system to provide portability and prevent carbonizing of the meat to avoid the above-mentioned problems.

BRIEF SUMMARY OF THE INVENTION

In view of the foregoing disadvantages inherent in the known food smoker art, the present invention provides a novel combination food smoker and grill system. The general purpose of the present invention, which will be described subsequently in greater detail, is to provide portability and prevent carbonizing of the grilled meat.

The combination food smoker and grill system as disclosed herein, in a preferred embodiment, is an effective ellipsoid shaped food smoker designed to prevent direct contact of the meat to be grilled with an open flame thereby effectively preventing the creation of carcinogenic, carbonized meat. More specifically, the combination food smoker and grill system comprises a pedestal smoker and grill assembly having an upper portion grill chamber with a hinged dome cover having at least one lift handle, at least one adjustable heat discharge vent, a lower portion grill chamber comprising a first comestible grill-screen, a second comestible grill-screen, a plurality of first comestible grill-screen supports, a plurality of second comestible grill-screen supports, a smoker screen assembly, a heat portal, and a heat column assembly having a base.

The upper portion grill chamber is preferably hingedly attached to the lower portion grill chamber such that in a closed position the upper portion grill chamber and the lower portion grill chamber forms an ellipsoid and contains heat produced therein sufficient to cook the comestibles on the grill. The hinged dome cover comprises at least one lift handle on a convex surface. The upper portion grill chamber may not be hinged but may have two handles for lifting the upper portion grill chamber directly off the lower portion grill chamber in alternate embodiments. The upper portion grill chamber may be removably latchable to the lower portion grill chamber such that a user-griller is able to lift the complete pedestal smoker and grill assembly via the at least one lift handle and carry from a first location to a second location. At least one adjustable heat discharge vent is preferably concentrically located on the hinged dome cover. The upper portion grill chamber within the inner volume comprises a framework having a plurality of hooks such that comestibles are able to be hung thereon for infusing with a smoke flavor. The lower portion grill chamber supports the upper portion grill chamber such that the lower portion grill chamber is convex downwardly and the upper portion grill chamber is convex upwardly to form an inner volume. The inner volume is useful for cooking with the heat contained therein.

The pedestal smoker and grill assembly comprises high temperature resistant steel, the first comestible grill-screen preferably comprises heavy gauge carbon steel, and the second comestible grill-screen also preferably comprises heavy gauge carbon steel; however other suitable equivalents may be used. The pedestal smoker and grill assembly is about 2½ feet in height and the first comestible grill-screen is about 2 feet in diameter and the second comestible grill-screen is about 16 inches in diameter. The first comestible grill-screen is nested within the inner volume of the lower portion grill chamber about an inner transverse diameter and supported by a plurality of first comestible grill-screen supports. The second comestible grill-screen is located below and substantially parallel planar to the first comestible grill-screen and supported within the lower portion grill chamber by a plurality of second comestible grill-screen supports.

The heat portal is concentrically located within the convex of the lower portion grill chamber and the smoker screen assembly is situated about the heat portal such that a heated air flow rising through the heat column assembly passes through the smoker screen assembly. The heat column assembly concentrically supports the lower portion grill chamber and may further comprise an air in-flow damper for adjusting an air in-flow and thereby proportionally adjusting a combustion temperature within the pedestal smoker and grill assembly. The heat column assembly may further comprise a combustion support deck such that the combustion source is supported at a slightly elevated height from a bottom floor of the heat column assembly and may support combustible fuel materials as a heat generating source, or alternately may comprise a flammable gas as a combustion source. The heat column assembly further may comprise a hinged combustion chamber hatch such that a combustion source is easily inserted and removed after combustion.

The heated air-flow travels upwards through the heat portal and the smoker screen assembly creating upward moving smoke contacting the at least one comestible (meat or other) and infusing the comestible(s) with a smoke flavor. The open flame of the combustion source does not contact comestibles thereby substantially eliminating a creation of carcinogenic carbons. The base is removably affixed to the heat column assembly such that it provides vertical stability to the pedestal smoker and grill assembly. The pedestal smoker and grill assembly is useful for applying a combustion source within the heat column assembly thereby creating a heated upward air movement such that smoke is created at the smoker screen assembly and smoke-grilling at least one comestible situated on the first comestible grill-screen or the second comestible grill-screen.

The combination food smoker and grill system may further comprise a kit having a pedestal smoker and grill assembly, a bag of smoke producing wood, and a set of user instructions.

A method of use for a combination food smoker and grill system may comprise the steps of: opening a hinged combustion chamber hatch; inserting a combustible heat generating material; igniting the combustible heat generating material; closing the hinged combustion chamber hatch; adjusting an air in-flow damper to adjust temperature; lift-rotating an upper portion grill chamber; placing at least one comestible to be smoke-grilled on a first comestible grill-screen and a second comestible grill-screen; closing the upper portion grill chamber; adjusting an adjustable heat discharge vent; smoke-grilling the comestibles; removing and consuming the comestibles; and cleaning the pedestal smoker and grill assembly for a future use.

The present invention holds significant improvements and serves as a combination food smoker and grill system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, combination food smoker and grill system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a food grilling device and more particularly to a combination food smoker and grill system as used to improve the portability of a smoker system as well as the safety of grilled food by preventing direct flame contact. The cooked comestible has good flavor and is cooked efficiently.

Generally speaking, the combination food smoker and grill system is an effective ellipsoid shaped food smoker designed to prevent direct contact of the meat to be grilled with an open flame thereby preventing the creation of carcinogenic, carbonized meat.

Figure 1:
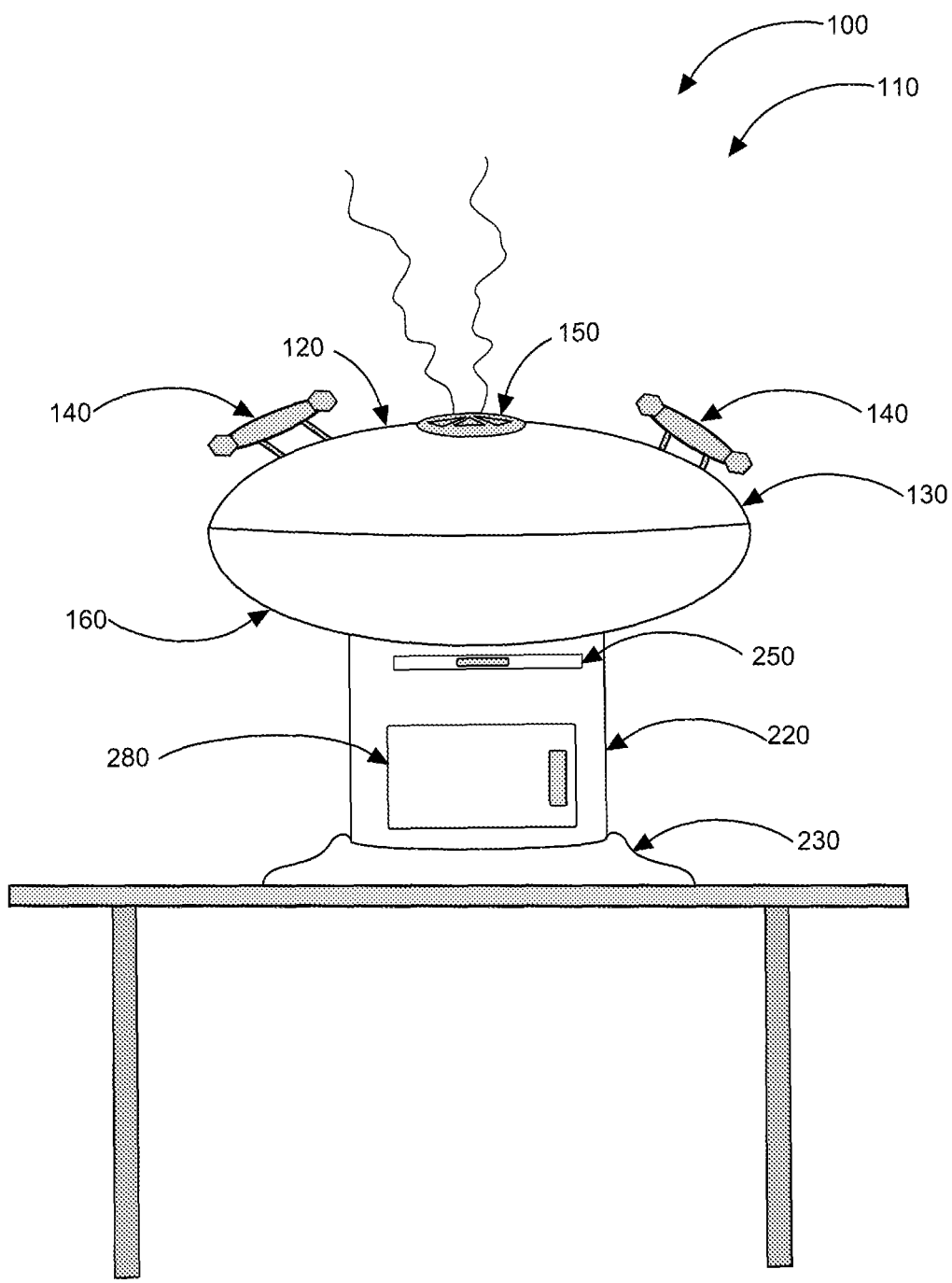
FIG. 1 shows a perspective view illustrating an in-use condition of a combination food smoker and grill system according to an embodiment of the present invention.

In greater detail now, referring to the drawings by numerals of reference there is shown in FIG. 1, a perspective view illustrating an in-use condition of combination food smoker and grill system 100 according to an embodiment of the present invention.

Combination food smoker and grill system 100 comprises pedestal smoker and grill assembly 110 having upper portion grill chamber 120 with hinged dome cover 130 having at least one lift handle 140, at least one adjustable heat discharge vent 150, lower portion grill chamber 160 comprising first comestible grill-screen 170, second comestible grill-screen 180, a plurality of first comestible grill-screen supports 190, a plurality of second comestible grill-screen supports 199, smoker screen assembly 200, heat portal 210, and heat column assembly 220 having base 230.

Upper portion grill chamber 120 is hingedly attached to lower portion grill chamber 160 such that in a closed position upper portion grill chamber 120 and lower portion grill chamber 160 form an ellipsoid (other shapes are possible, but not preferable.) Hinged dome cover 130 comprises at least one lift handle 140 on a convex surface. Alternately, upper portion grill chamber 120 may not be hinged but may have two lift handle(s) 140 for lifting upper portion grill chamber 120 directly off lower portion grill chamber 160. Upper portion grill chamber 120 may be removably latchable to lower portion grill chamber 160 such that a user-griller is able to lift the complete pedestal smoker and grill assembly 110 via the at least one lift handle(s) 140 and carry from a first location to a second location, making the device portable in design, light enough that one individual can transport it. At least one adjustable heat discharge vent 150 is concentrically located on hinged dome cover 130. Upper portion grill chamber 120 within the inner volume comprises a framework having a plurality of hooks 240 such that comestibles are able to be hung thereon for infusing with smoke flavor. In this way the present invention is able to provide that food is tasty when prepared.

Figure 2:
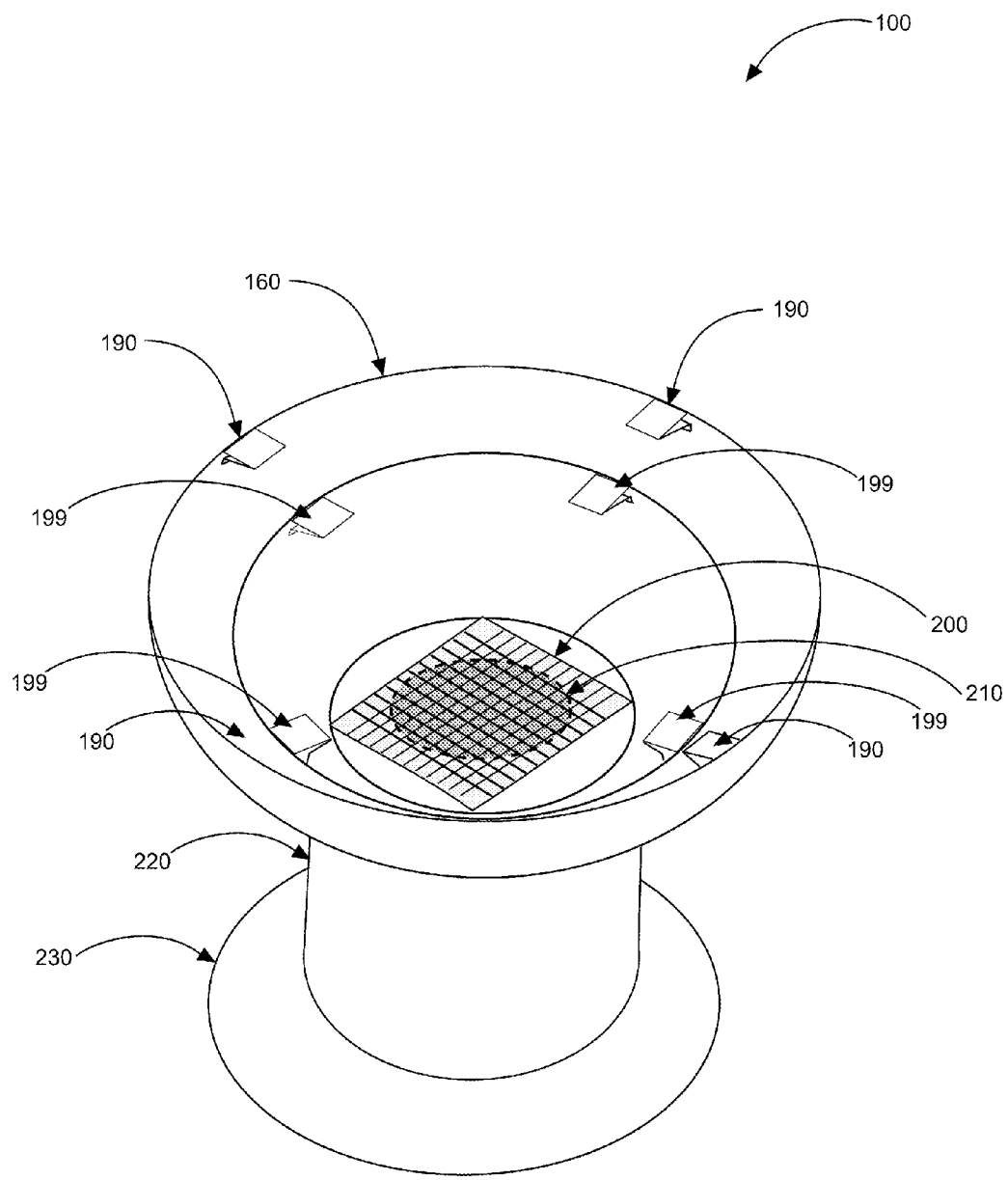
FIG. 2 is a perspective view illustrating a lower portion grill chamber of a combination food smoker and grill system according to an embodiment of the present invention of FIG. 1.

Referring now to FIG. 2, a perspective view illustrating lower portion grill chamber 160 of combination food smoker and grill system 100 according to an embodiment of the present invention of FIG. 1.

Lower portion grill chamber 160 supports upper portion grill chamber 120 such that lower portion grill chamber 160 is convex downwardly and upper portion grill chamber 120 is convex upwardly to form an inner volume. Pedestal smoker and grill assembly 110 comprises high temperature resistant steel, first comestible grill-screen 170 comprises heavy gauge carbon steel, and second comestible grill-screen 180 comprises heavy gauge carbon steel.

Pedestal smoker and grill assembly 110 is about 2½ feet in height, first comestible grill-screen 170 is about 2 feet in diameter, and second comestible grill-screen 180 is about 16 inches in diameter; however other sizes and proportioning may be manufactured and still be considered within the scope of the present invention. Further, alternate materials may also be used. First comestible grill-screen 170 is preferably nested within the inner volume of lower portion grill chamber 160 about an inner transverse diameter and supported by the plurality of first comestible grill-screen supports 190. Second comestible grill-screen 180 is located below and substantially parallel planar to first comestible grill-screen 170 and supported within lower portion grill chamber 160 by the plurality of second comestible grill-screen supports 199. Heat portal 210 is concentrically located within the convex of lower portion grill chamber 160 and smoker screen assembly 200 is situated about heat portal 210 such that a heated air flow rising through heat column assembly 220 passes through smoker screen assembly 200. In this way the comestible is evenly smoked and cooked.

Figure 3:
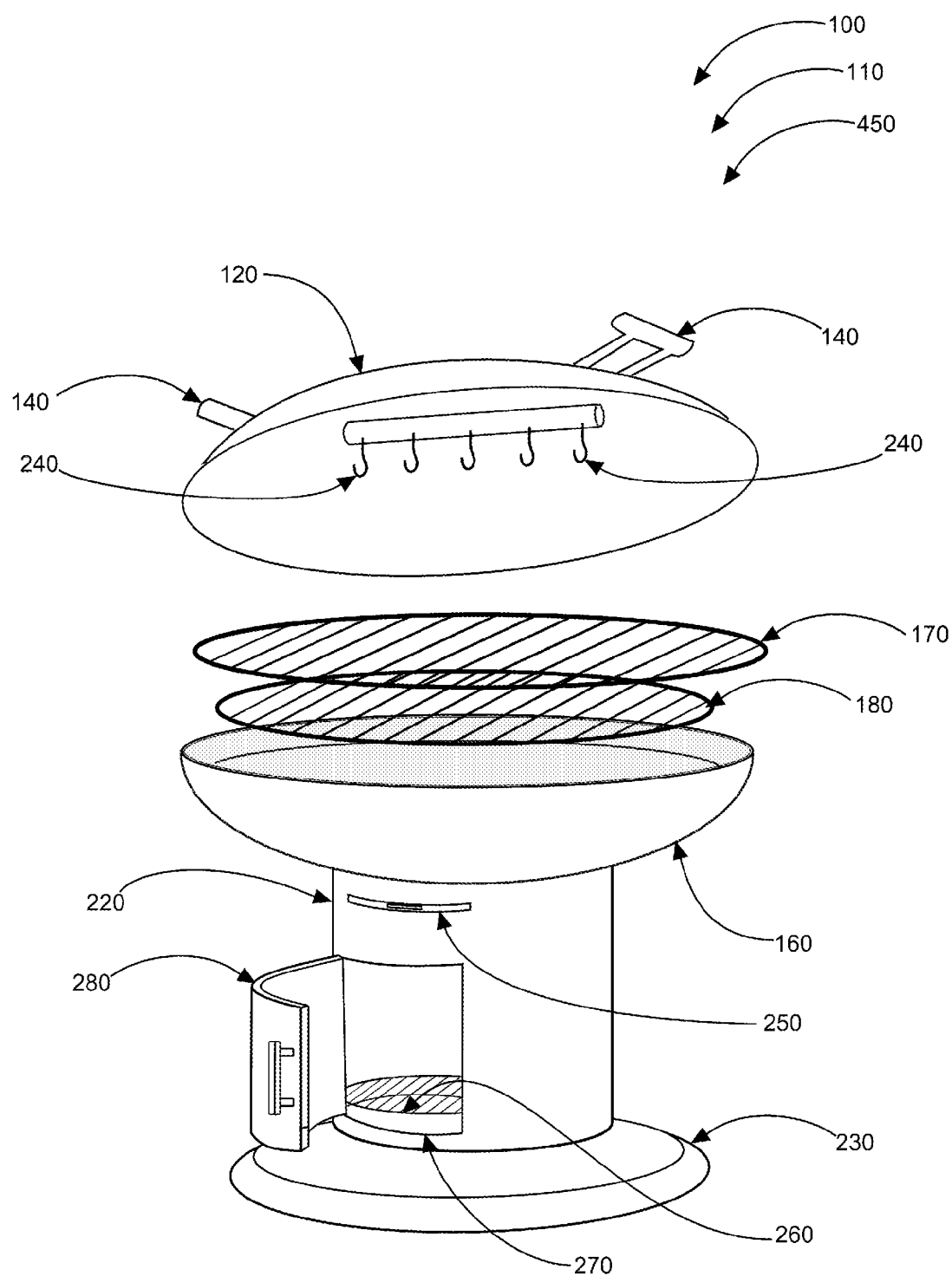
FIG. 3 is another perspective view illustrating a combination food smoker and grill system according to an embodiment of the present invention of FIG. 1.

Referring now to FIG. 3, is another perspective view illustrating combination food smoker and grill system 100 according to an embodiment of the present invention of FIG. 1.

The heated air-flow travels upwards through heat portal 210 and smoker screen assembly 200 creating upward moving smoke (draft) contacting the at least one comestible and infusing the comestible(s) with a smoke flavor. The open flame of the combustion source does not contact comestibles thereby eliminating a creation of carcinogenic carbons. Base 230 is removably affixed to heat column assembly 220 such that it provides vertical stability to pedestal smoker and grill assembly 110 such as in windy conditions or the like. Pedestal smoker and grill assembly 110 is useful for applying a combustion source within heat column assembly 220 thereby creating a heated upward air movement such that smoke is created at smoker screen assembly 200 and smoke-grilling at least one comestible situated on first comestible grill-screen 170 or second comestible grill-screen 180 is achieved when in use.

Figure 4:
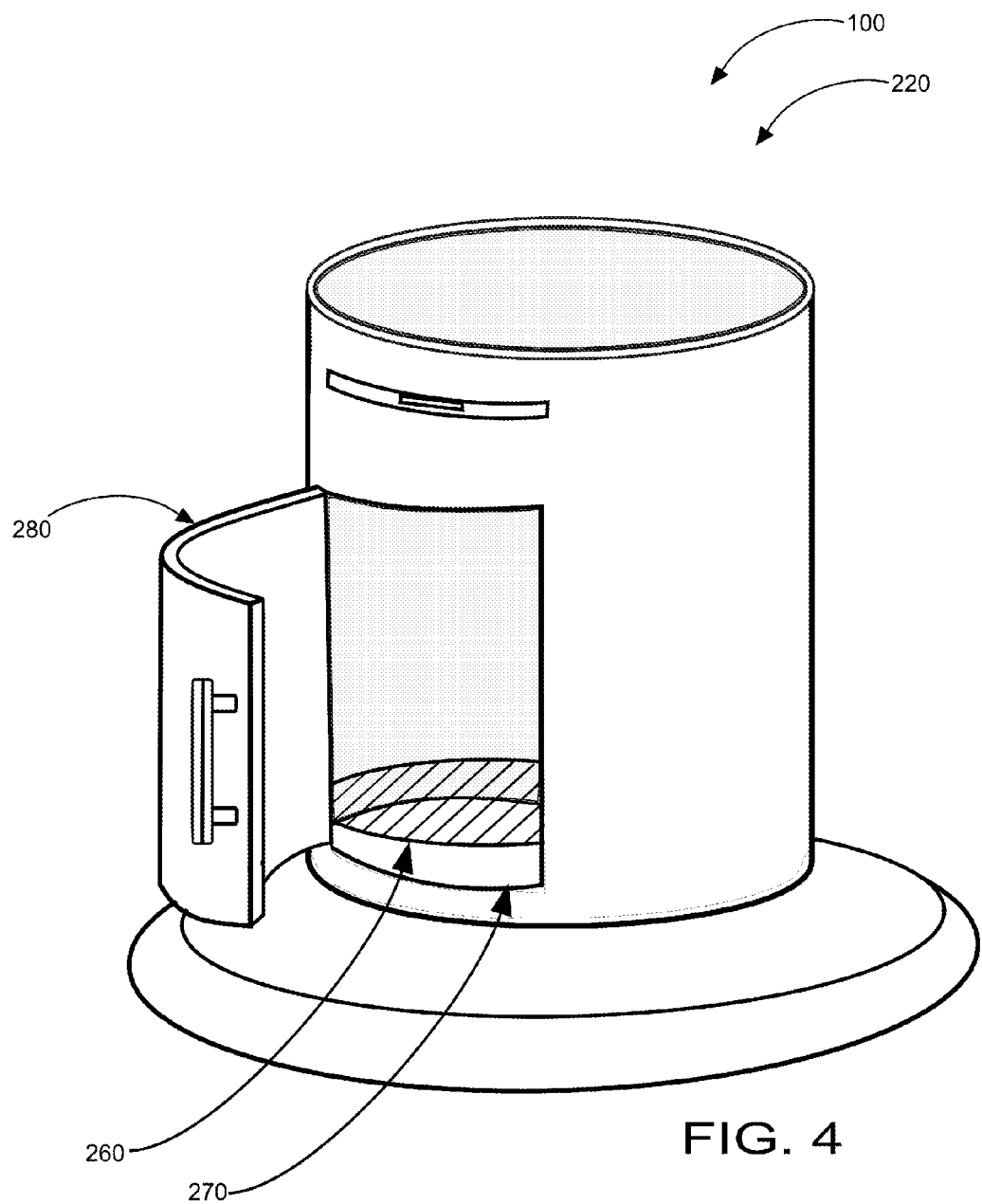
FIG. 4 is a perspective view illustrating a heat column assembly of a combination food smoker and grill system according to an embodiment of the present invention of FIG. 1.

Referring now to FIG. 4, a perspective view illustrating heat column assembly 220 of combination food smoker and grill system 100 according to an embodiment of the present invention of FIG. 1.

Heat column assembly 220 concentrically supports lower portion grill chamber 160 and further comprises air in-flow damper 250 for adjusting an air in-flow and thereby proportionally adjusting a combustion temperature within pedestal smoker and grill assembly 110. Heat column assembly 220 further may comprise combustion support deck 260 such that the combustion source is supported at a slightly elevated height from bottom floor 270 of heat column assembly 220 and may support combustible fuel materials as a heat generating source, or may comprise a flammable gas as a combustion source. Heat column assembly 220 further may comprise hinged combustion chamber hatch 280 such that a combustion source is easily inserted and removed after combustion (cooking is completed.)

Combination food smoker and grill system 100 according to an embodiment of the present invention of FIGS. 1-4, may be sold as kit 450 comprising the following parts: at least one pedestal smoker and grill assembly 110; at least one bag of smoke producing wood; and a set of user instructions. Combination food smoker and grill system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
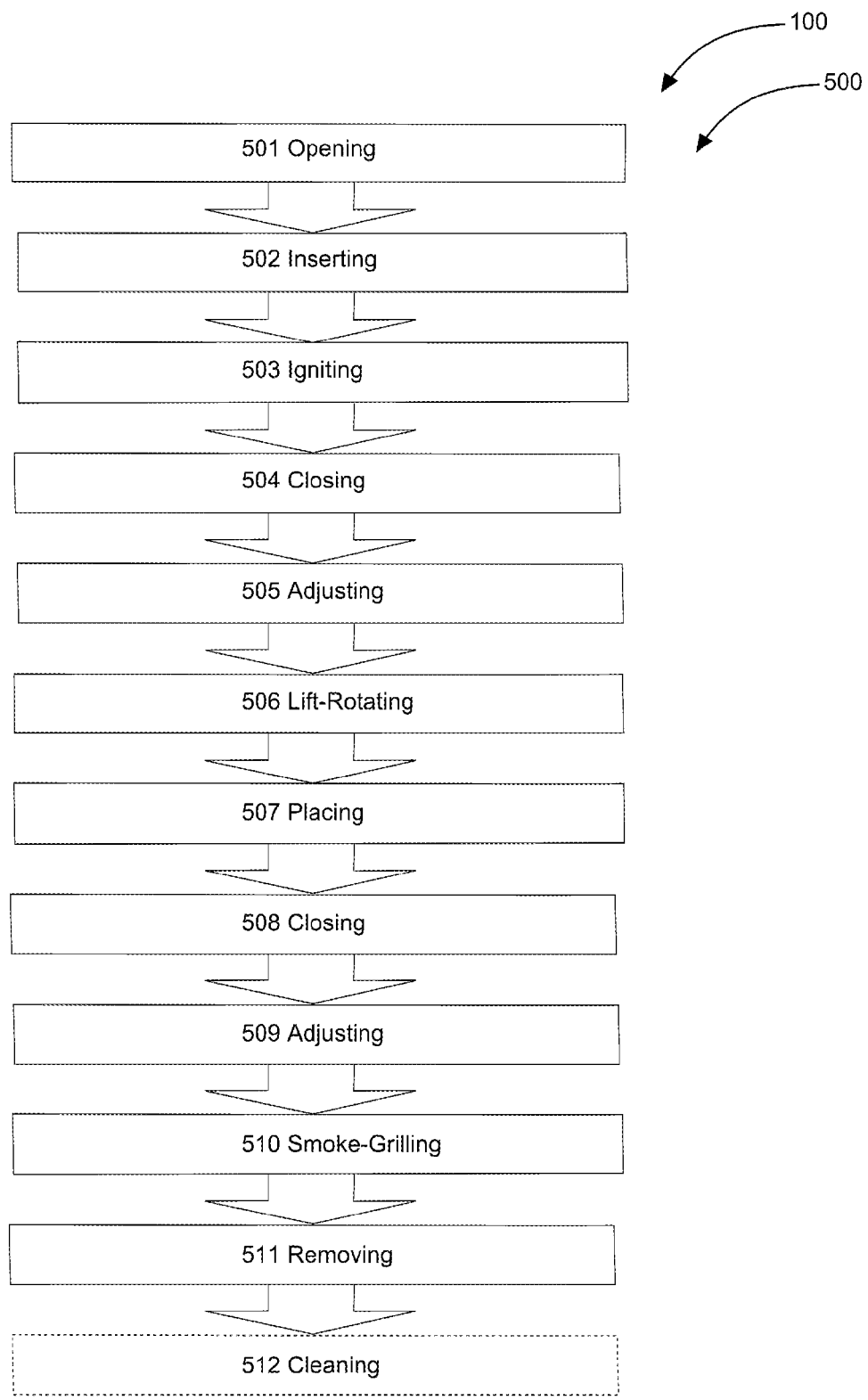
FIG. 5 is a flowchart illustrating a method of use for the combination food smoker and grill system according to an embodiment of the present invention of FIGS. 1-4.

Referring now to FIG. 5, showing a flowchart illustrating method of use 500 for combination food smoker and grill system 100 according to an embodiment of the present invention of FIGS. 1-4.

A method of use 500 for combination food smoker and grill system 100 may comprise the steps of: step one 501, opening hinged combustion chamber hatch 280; step two 502, inserting a combustible heat generating material; step three 503, igniting the combustible heat generating material; step four 504, closing hinged combustion chamber hatch 280; step five 505, adjusting air in-flow damper 250 to adjust temperature; step six 506, lift-rotating upper portion grill chamber 120; step seven 507, placing at least one comestible to be smoke-grilled on first comestible grill-screen 170 and second comestible grill-screen 180; step eight 508, closing upper portion grill chamber 120; step nine 509, adjusting adjustable heat discharge vent 150; step ten 510, smoke-grilling the comestibles; step eleven 511, removing and consuming the comestibles; and step twelve 512, cleaning pedestal smoker and grill assembly 110.

It should be noted that step 512 is an optional step and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A combination food smoker and grill system comprising:
    a pedestal smoker and grill assembly having;
        an upper portion grill chamber comprising;
        a hinged dome cover having;
        at least one lift handle; and
        at least one adjustable heat discharge vent;
    a lower portion grill chamber comprising;
        a first comestible grill-screen;
        a second comestible grill-screen;
        a plurality of first comestible grill-screen supports;
        a plurality of second comestible grill-screen supports;
        a smoker screen assembly; and
        a heat portable;
    a heat column assembly; and
    a base;
    wherein said upper portion grill chamber is hingedly attached to said lower portion grill chamber such that in a closed position said upper portion grill chamber and said lower portion grill chamber form an ellipsoid;
    wherein said hinged dome cover comprises said at least one lift handle on a convex surface;
    wherein said at least one adjustable heat discharge vent is concentrically located on said hinged dome cover;
    wherein said lower portion grill chamber supports said upper portion grill chamber such that said lower portion grill chamber is convex downwardly and said upper portion grill chamber is convex upwardly to form an inner volume;
    wherein said first comestible grill-screen is nested within said inner volume of said lower portion grill chamber about an inner transverse diameter and supported by said plurality of said first comestible grill-screen supports;
    wherein said second comestible grill-screen is located below and parallel planar to said first comestible grill-screen and supported within said lower portion grill chamber by said plurality of second comestible grill-screen supports;
    wherein said heat portal is concentrically located within said convex of said lower portion grill chamber;
    wherein said smoker screen assembly is situated about said heat portal such that a heated air flow rising through said heat column assembly passes through said smoker screen assembly;
    wherein said heat column assembly concentrically supports said lower portion grill chamber;
    wherein said base is removably affixed to said heat column assembly such that it provides vertical stability to said pedestal smoker and grill assembly; and
    wherein said pedestal smoker and grill assembly is useful for applying a combustion source within said heat column assembly thereby creating a heated upward air movement such that smoke is created at said smoker screen assembly and smoke-grilling is performed on at least one comestible situated on said first comestible grill-screen and said second comestible grill-screen;
    wherein said heat column assembly further comprises an air in-flow damper for adjusting an air in-flow and thereby adjusting a combustion temperature within said pedestal smoker and grill assembly.

2. The combination food smoker and grill system of claim 1 wherein said heat column assembly further comprises a hinged combustion chamber hatch such that a combustion source is easily inserted and removed after combustion.

3. The combination food smoker and grill system of claim 2 wherein said heat column assembly further comprises a combustion support deck such that said combustion source is supported at a slightly elevated height from a bottom floor of said heat column assembly.

4. The combination food smoker and grill system of claim 3 wherein said combustion source is combustible fuel materials.

5. The combination food smoker and grill system of claim 4 wherein said combustion source is a flammable gas.

6. The combination food smoker and grill system of claim 4 wherein said open flame of said combustion source does not contact comestibles thereby eliminating a creation of carcinogenic carbons.

7. The combination food smoker and grill system of claim 1 wherein said heated air-flow traveling upwards through said heat portal and said smoker screen assembly creates upward moving smoke in a draft contacting said at least one comestible and infusing said at least one comestible with a smoke flavor.

8. The combination food smoker and grill system of claim 1 wherein said first comestible grill-screen is about 2 feet in diameter.

9. The combination food smoker and grill system of claim 1 wherein said second comestible grill-screen is about 16 inches in diameter.

10. The combination food smoker and grill system of claim 8 wherein said first comestible grill-screen comprises heavy gauge carbon steel.

11. The combination food smoker and grill system of claim 9 wherein said second comestible grill-screen comprises heavy gauge carbon steel.

12. The combination food smoker and grill system of claim 1 wherein said pedestal smoker and grill assembly comprises high temperature resistant steel.

13. The combination food smoker and grill system of claim 1 wherein said upper portion grill chamber within said inner volume comprises a framework having a plurality of hooks such that comestibles are able to be hung thereon for infusing with smoke flavor.

14. The combination food smoker and grill system of claim 1 wherein said pedestal smoker and grill assembly is about 2½ feet in height.

15. The combination food smoker and grill system of claim 1 wherein said upper portion grill chamber is not hinged.

16. The combination food smoker and grill system of claim 1 wherein said upper portion grill chamber is removably latchable to said lower portion grill chamber such that a user-griller is able to lift a complete said pedestal smoker and grill assembly via said at least one lift handle and carry from a first location to a second location.

17. A combination food smoker and grill system comprising:
   a pedestal smoker and grill assembly having;
      an upper portion grill chamber comprising;
         a hinged dome cover having;
            at least one lift handle; and
            at least one adjustable heat discharge vent;
      a lower portion grill chamber comprising;
         a first comestible grill-screen;
         a second comestible grill-screen;
         a plurality of first comestible grill-screen supports;
         a plurality of second comestible grill-screen supports;
         a smoker screen assembly; and
         a heat portal; and
      a heat column assembly; and
      a base;
   wherein said upper portion grill chamber is hingedly attached to said lower portion grill chamber such that in a closed position said upper portion grill chamber and said lower portion grill chamber form an ellipsoid;
   wherein said hinged dome cover comprises said at least one lift handle on a convex surface;
   wherein said upper portion grill chamber is not hinged;
   wherein said upper portion grill chamber is removably latchable to said lower portion grill chamber such that a user-griller is able to lift a complete said pedestal smoker and grill assembly via said at least one lift handle and carry from a first location to a second location;
   wherein said at least one adjustable heat discharge vent is concentrically located on said hinged dome cover;
   wherein said upper portion grill chamber within said inner volume comprises a framework having a plurality of hooks such that comestibles are able to be hung thereon for infusing with smoke flavor;
   wherein said lower portion grill chamber supports said upper portion grill chamber such that said lower portion grill chamber is convex downwardly and said upper portion grill chamber is convex upwardly to form an inner volume;
   wherein said pedestal smoker and grill assembly comprises high temperature resistant steel;
   wherein said pedestal smoker and grill assembly is about 2½ feet in height;
   wherein said first comestible grill-screen is nestable within said inner volume of said lower portion grill chamber about an inner transverse diameter and supported by said plurality of said first comestible grill-screen supports;
   wherein said first comestible grill-screen is about 2 feet in diameter;
   wherein said first comestible grill-screen comprises heavy gauge carbon steel;
   wherein said second comestible grill-screen is located below and parallel planar to said first comestible grill-screen and supported within said lower portion grill chamber by said plurality of second comestible grill-screen supports;
   wherein said second comestible grill-screen is about 16 inches in diameter;
   wherein said second comestible grill-screen comprises heavy gauge carbon steel;
   wherein said heat portal is concentrically located within said convex of said lower portion grill chamber;
   wherein said smoker screen assembly is situated about said heat portal such that a heated air flow rising through said heat column assembly passes through said smoker screen assembly;
   wherein said heat column assembly concentrically supports said lower portion grill chamber;
   wherein said heat column assembly further comprises an air in-flow damper for adjusting an air in-flow and thereby proportionally adjusting a combustion temperature within said pedestal smoker and grill assembly;
   wherein said heat column assembly further comprising a combustion support deck such that said combustion source is supported at a slightly elevated height from a bottom floor of said heat column assembly;
   wherein said combustion source is combustible fuel materials;
   wherein said heat column assembly further comprising a hinged combustion chamber hatch such that a combustion source is easily inserted and removed after combustion;
   wherein said combustion source uses flammable gas;
   wherein said heated air-flow traveling upwards through said heat portal and said smoker screen assembly creates upward moving smoke contacting said at least one comestible and infusing said at least one comestible with a smoke flavor;
   wherein said open flame of said combustion source does not contact comestibles thereby eliminating a creation of carcinogenic carbons;
   wherein said base is removably affixed to said heat column assembly such that it provides vertical stability to said pedestal smoker and grill assembly; and
   wherein said pedestal smoker and grill assembly is useful for applying said combustion source within said heat column assembly thereby creating a heated upward air movement such that smoke is created at said smoker screen assembly and smoke-grilling at least one comestible situated on said first comestible grill-screen or said second comestible grill-screen.

18. The combination food smoker and grill system of claim 17 further comprising a kit having:
   said pedestal smoker and grill assembly;
   a bag of smoke producing wood; and
   a set of user instructions.

* * * * *